(12) United States Patent
Bi et al.

(10) Patent No.: US 6,724,822 B1
(45) Date of Patent: Apr. 20, 2004

(54) EFFICIENT MOTION COMPENSATION APPARATUS FOR DIGITAL VIDEO FORMAT DOWN-CONVERSION USING GENERALIZED ORTHOGONAL TRANSFORMATION

(75) Inventors: Mi Michael Bi, Singapore (SG); Peter Kwong Ming Kiew, Hurtsville (AU)

(73) Assignee: Matsushita Electric Industrial Co., Ltd., Osaka (JP)

( * ) Notice: Subject to any disclaimer, the term of this patent is extended or adjusted under 35 U.S.C. 154(b) by 403 days.

(21) Appl. No.: 09/668,379

(22) Filed: Sep. 25, 2000

(30) Foreign Application Priority Data

Oct. 1, 1999 (JP) .............................. 11-281373

(51) Int. Cl.$^7$ ................................ H04N 7/18
(52) U.S. Cl. ...................... 375/240.17; 375/240.21
(58) Field of Search ............... 348/440–453; 375/240.11–240.21

(56) References Cited

U.S. PATENT DOCUMENTS

| 4,768,159 | A | | 8/1988 | Gray et al. | |
| 6,452,969 | B1 | * | 9/2002 | Yim | 375/240.02 |
| 6,456,663 | B1 | * | 9/2002 | Kim | 375/240.25 |
| 6,489,815 | B2 | * | 12/2002 | Ohno | 327/108 |
| 6,539,120 | B1 | * | 3/2003 | Sita et al. | 382/233 |

FOREIGN PATENT DOCUMENTS

| EP | 0707426 | 4/1996 |
| EP | 0786902 | 7/1997 |
| EP | 0794675 | 9/1997 |
| JP | 2000-350207 | 12/2000 |
| WO | 98/41011 | 9/1998 |

* cited by examiner

Primary Examiner—Andy Rao
(74) Attorney, Agent, or Firm—Greenblum & Bernstein, P.L.C.

(57) ABSTRACT

The invention described herein is an efficient motion compensation apparatus for digital video format down-conversion. This apparatus is characterized by an interpolation and decimation filters implemented using efficient computation architectures. The computation architecture comprises the frequency component computing section, coefficient weighting section and pixel reconstruction section. A simple architecture for both interpolation and decimation filtering processes has been invented. The result is the dramatic reduction of the shifting and adding or subtracting operations, making them suitable for implementation in LSI realization of the video format down-conversion of digital video systems.

20 Claims, 12 Drawing Sheets

Fig.2

$$K_0 = \begin{pmatrix} 1 & 1 & 1 \\ 1 & 0 & -1 \\ 2^{-1} & -1 & 2^{-1} \end{pmatrix}$$

$$K_1 = \begin{pmatrix} \alpha & \alpha & \alpha & \alpha & \alpha & \alpha & \alpha & \alpha \\ 2\beta & 2\beta & \beta & \beta & -\beta & -\beta & -2\beta & -2\beta \\ 2\gamma & \gamma & -2\gamma & -\gamma & -\gamma & -2\gamma & \gamma & 2\gamma \end{pmatrix}$$

$$K_2 = \begin{pmatrix} 1 & 2 & 2 \\ 1 & 2 & 1 \\ 1 & 1 & -2 \\ 1 & 1 & -1 \\ 1 & -1 & -1 \\ 1 & -1 & -2 \\ 1 & -2 & 1 \\ 1 & -2 & 2 \end{pmatrix}$$

$$K_3 = \begin{pmatrix} \sigma & \sigma & \sigma \\ \mu & 0 & -\mu \\ \nu & -2\nu & \nu \end{pmatrix}$$

$$K_4 = \begin{pmatrix} 1 & 1 & 2^{-1} \\ 1 & 0 & -1 \\ 1 & -1 & 2^{-1} \end{pmatrix}$$

$\alpha = 1/3$, $\beta = 0.2581988897471611$, $\gamma = 0.2981423969999719$,
$\sigma = 1/8$, $\mu = 0.09682458365585034$, $\nu = 0.05590169943787863$,

EFFICIENT MOTION COMPENSATION APPARATUS FOR DIGITAL VIDEO FORMAT DOWN-CONVERSION USING GENERALIZED ORTHOGONAL TRANSFORMATION

BACKGROUND OF THE INVENTION

1. Field of the Invention

The invention is applicable to the implementation of a digital video format down-conversion for use in digital video decoder. Typical applications of this invention include HDTV decoding, video conferencing and picture-in-picture systems.

2. Description of the Prior Art

Low-resolution digital video decoders have received considerably attention lately in academia and industry. In a digital video decoding system, the format down-conversion can be achieved by decimating the decoded full-resolution video sequences. Reconstructed video with good quality can be obtained by using this method. However, the decimation of decoded video sequences adds complexity to the full-resolution video decoding. In order to reduce the amount of computation, the memory size and other constrains such as memory bandwidth and clock rates incurred by this approach, image decimation has to be realized in the earlier stage of the decoder, for example, inside the decoding loop.

Figure 1:
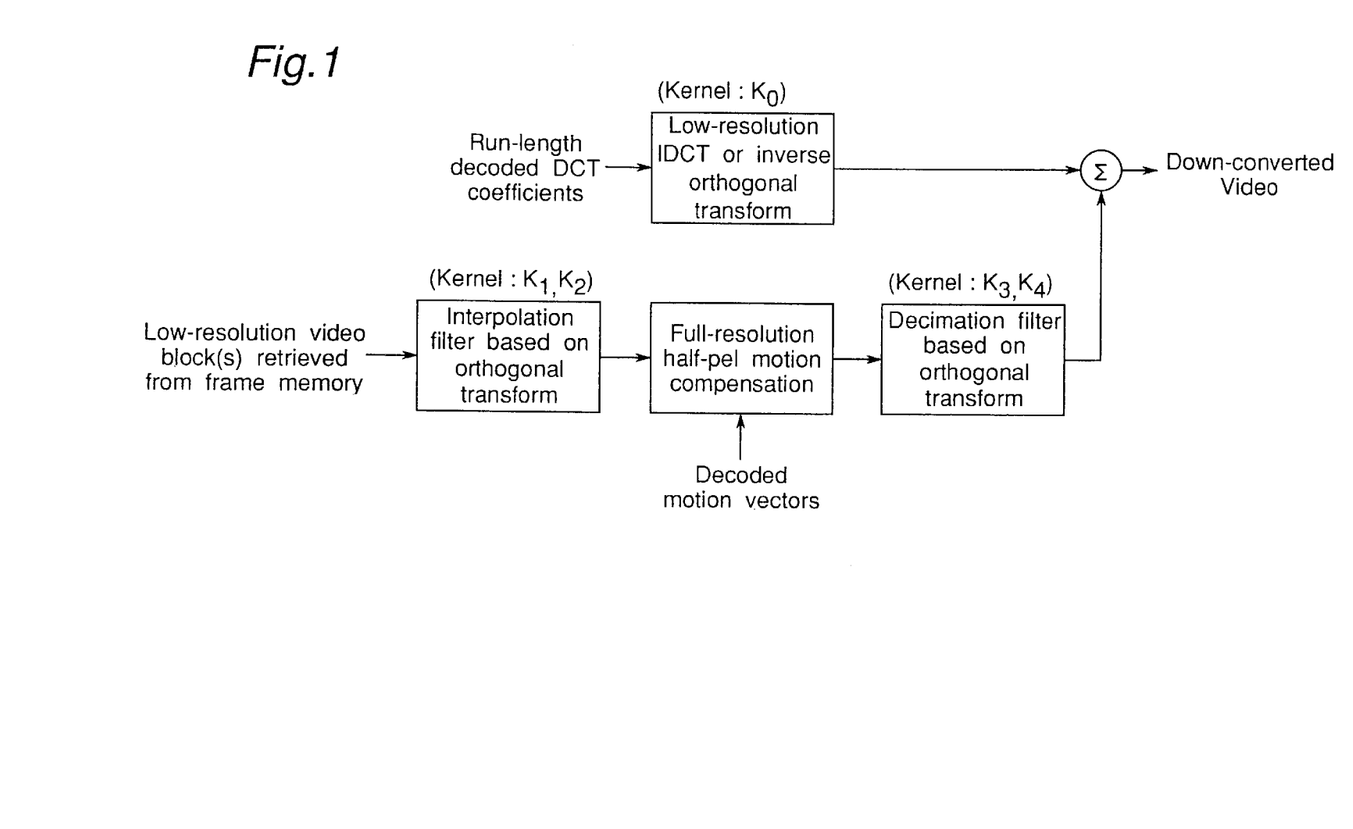
FIG. 1 illustrates a block diagram for low-resolution video decoder described in the prior art.
Figure 2:
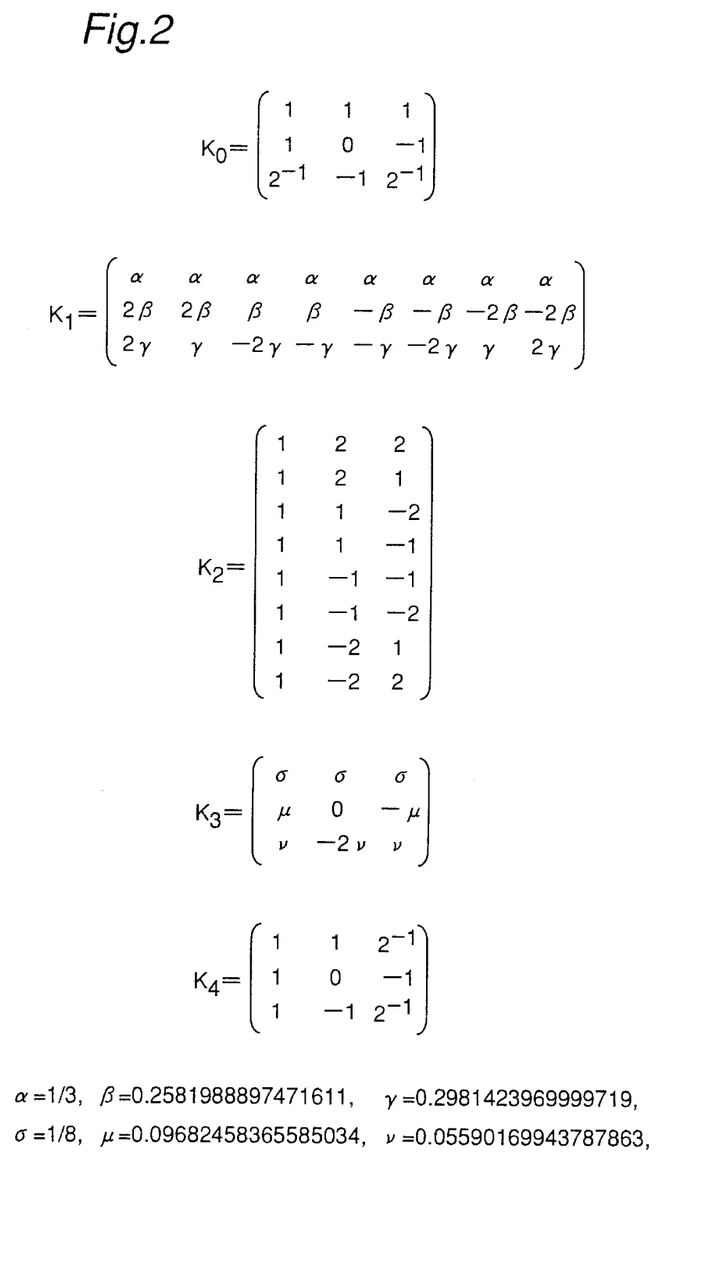
FIG. 2 illustrates kernels for interpolation and decimation section for video decoding with the down-conversion ratio of 8:3.
Figure 3:
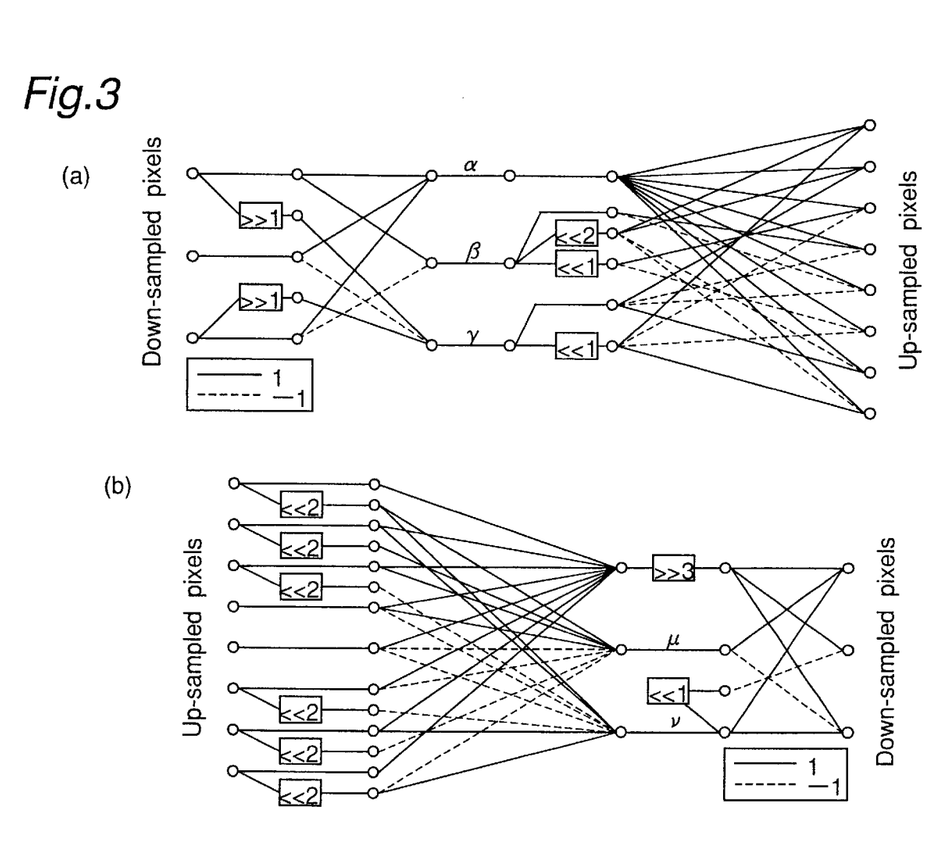
FIG. 3 illustrates the direct computation architecture of transform kernels for 8:3 digital video down-conversion, FIG. 3(a) showing computation architecture for interpolation filtering, FIG. 3(b) showing computation architecture for decimation filtering.

An effective method for the digital video format down-conversion has been invented and filed in Japan on Jun. 8, 1999, entitled "A generalized orthogonal transform method for low-resolution video decoding", with application No. H11-160876, and assigned to Matsushita Electric Industrial Co. Ltd., which is herein enclosed by reference. FIG. 1 shows a block diagram of this video format down-conversion method. The details of the system operation and the orthogonal kernels were discussed in the above-mentioned application. In this architecture, the low-resolution pixels stored in the frame buffer are interpolated and decimated using orthogonal transform basis functions before and after the full-resolution motion compensation. The interpolation and decimation filters play a very important role in controlling the error propagation introduced by picture decimation of the format down-conversion system of digital video. In the format down-conversion system of digital video shown in FIG. 1, these filters are realized using a number of orthogonal transform kernels. One example for the orthogonal transform kernels used for video down-conversion with the decimation ratio of 8:3 are illustrated in FIG. 2. The direct computation architecture of the interpolation and decimation filtering operations based on these kernels are shown in FIG. 3. Since the coefficients of the kernels are simple, the implementation of the system is relatively easy compared to the conventional digital video format down-conversion methods. Simulation results show that this method is also very effective in error propagation control.

SUMMARY OF THE INVENTION

The digital video format down-conversion method using orthogonal transform described in the prior art generates high quality down-converted video. Although the transform kernels consists of simple coefficients, more efficient implementation method for efficient computation of the orthogonal transforms is still needed in order for the system to handle high bit rate video decoding, such as HDTV decoding. The problem to be solved by the current invention is to establish efficient computation architecture for the interpolation and decimation filtering processes to achieve effective motion compensation for the digital video format down-conversion system mentioned in the prior art.

In order to solve the above-described problem, efficient computation architecture for implementing interpolation and decimation filters used by the digital video format down-conversion system is invented. The computation architecture comprises a frequency component computing section, a coefficient weighting section and a pixel reconstruction section. Less computational operations are required compared to the direct implementation of the orthogonal transform kernels described in the prior art.

The frequency component computing section is used to transform the input into frequency domain to generate the transform coefficients. The coefficient weighting section is used for receiving transform coefficients and generating weighted transform coefficients. The weighted transform coefficients are finally transformed into spatial domain to generate the filtered pixels having different resolution from the original pixels.

The operation of the computation architecture for the interpolation and decimation filtering processes is now explained. The original pixels are transformed into frequency domain by the frequency component computing section to generate the transform coefficients. The transform coefficients are multiplied by a set of pre-determined constants by the coefficient weighting section to generate the weighted transform coefficients. The weighted transform coefficients are transformed from frequency domain into spatial domain by the pixel reconstruction section to provide filtered pixels which have different resolution from the original pixels.

The operations of the frequency component computing section are now explained. A reversed sequence of a block of the original pixels is generated in upper or lower address reversed order. A pair of selected pixel sequences is selected from the pixel sequence, the reversed sequence, the transform coefficients and the bit-shifted coefficient sequence by a pixel selecting section. An operation indication sequence is generated by the pixel selecting section to indicate the adding or subtracting operation. The sum or difference of the pair of selected pixel sequences is computed based on the operation indication sequence to generate the transform coefficients. Each transform coefficient is shifted by one or more bits to generate the bit-shifted coefficient sequence.

The frequency component computing section can also be operated using another method described here. The data address reversing section provides a reversed data set of a block of the original pixels in upper or lower address reversed order. A data selecting section receives the original pixels and the reversed data set to provide an operation indication set and two selected data sets. The calculator computes sum or difference of each pair of the selected data to generate processed data. One or more cascaded arithmetic units receives the processed data, manipulates them algebraically to provide the transform coefficients.

The operations of the coefficient weighting section are now explained. Each transform coefficient is multiplied by one of the pre-determined constant values stored in the coefficient memory. The output of the multiplying section or the transform coefficients are switched based on a coefficient bypass control signal to provide the weighted transform coefficients. The coefficient bypass control signal is determined based on the transform kernels used for the format down-conversion system of digital video.

The operations of the pixel reconstruction section are now explained. The weighted transform coefficients are shifted by one or more bits to generate the bit-shifted vector. A pair of selected coefficient vectors is selected from the coefficient vector, the bit-shifted vector, filtered pixels and reversed pixel vector by a coefficient selecting section. An operation indication vector is generated by the coefficient selecting section to indicate the adding or subtracting operation. The sum or difference of the pair of coefficient samples is computed based on the operation indication vector to generate the filtered pixels. The reversed pixel vector of a block of filtered coefficients is generated by an address reversing section in upper or lower address reversed order.

The pixel reconstruction section can also be realized using one or more cascaded arithmetic units. The operations of the arithmetic units used for the frequency component computation section and pixel reconstruction section are now explained. The shifter shifts the input data by one or more bits to generate bit-shifted data set. The data selector receives the input data and the bit-shifted data set to provide an operation indication set and two selected data sets. A calculator adds or subtracts two selected data sets based on the operation indication.

The input terminal of the frequency component computing section can be coupled to the output terminal of the frame buffer, and the output terminal of the pixel reconstruction section can provide the interpolated pixels to the motion compensation section.

The input terminal of the frequency component computing section can be coupled to the output terminal of the motion compensation section, and the output terminal of the pixel reconstruction section can provide the decimated pixels to the adding section.

BRIEF DESCRIPTION OF THE DRAWINGS

These and other objects and features of the present invention will become clear from the following description taken in conjunction with the preferred embodiments thereof with reference to the accompanying drawings throughout which like parts are designates by like reference numerals, and in which:

FIG. 12 illustrates the computation architectures, FIG. 12(a) showing interpolation filter, and FIG. 12(b) showing decimation filter used for digital video format down-conversion with the ratio of 8:3.

DETAILED DESCRIPTION OF THE PREFERRED EMBODIMENTS

Figure 4:
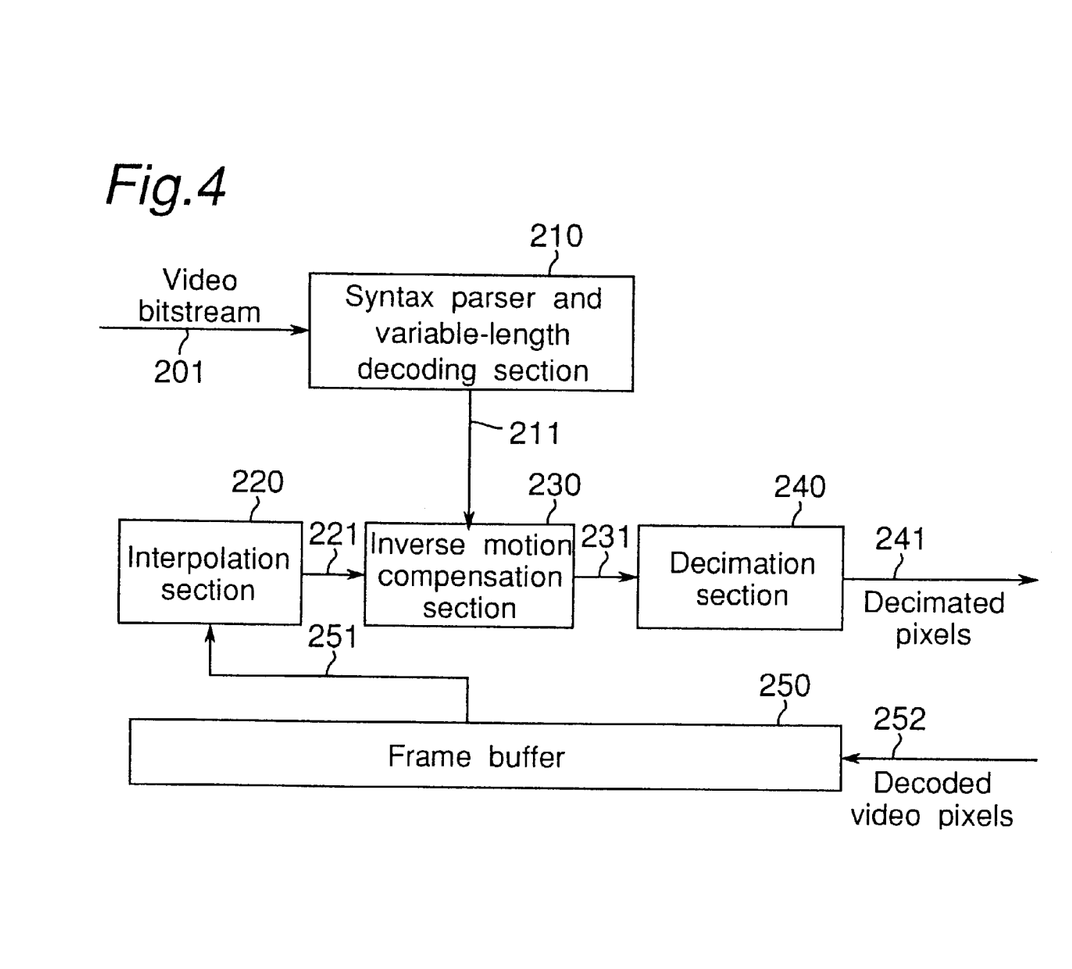
FIG. 4 illustrates a block diagram of an efficient motion compensation apparatus for low-resolution digital video format down-conversion system.

An embodiment shown in FIG. 4 illustrates the block diagram of an efficient motion compensation system for digital video format down-conversion. The system comprises a syntax parser and variable-length decoding section 210, an interpolation section 220, an inverse motion compensation section 230, a decimation section 240 and a frame buffer 250. The interpolation section 220 and the decimation section 240 are used before and after the inverse motion compensation section 230.

The video bit stream 201 is first decoded by the syntax parser and variable-length decoding section 210 to obtain the decoded motion parameters 211. The frame buffer 250 stores low-resolution video pictures. The low-resolution reference pixels 251 are retrieved from the frame buffer 250 by the interpolation section 220 and interpolated to generate the interpolated pixels 221 for inverse motion compensation section 230. The inverse motion compensation section 230 performs half-pel motion compensation based on the interpolated pixels 221 and the decoded motion parameters 211 to obtain the motion-compensated pixels 231. The motion-compensated pixels 231 are then decimated by the decimation section 240 to generate decimated pixels 241.

The effect of this embodiment is that the accuracy of inverse motion compensation for down-converted video can be improved by introducing the interpolation section and the decimation section. Since the format down-conversion processing of each video frame introduces error, it is extremely important to control the propagation of decoding errors. The properly designed interpolation section and decimation section are efficient error control engines for minimizing the error of each decoded frame.

Figure 5:
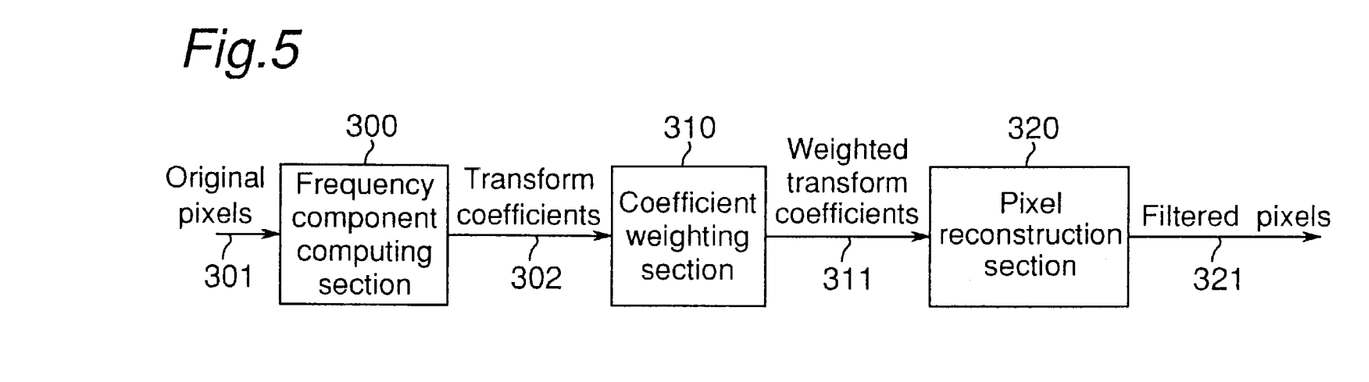
FIG. 5 illustrates a block diagram for interpolation and decimation filtering processes.

Another embodiment shown in FIG. 5 explains the method used in the interpolation and decimation section illustrated in FIG. 4. It comprises a frequency component computing section 300, a coefficient weighting section 310 and a pixel reconstruction section 320.

The operation of this embodiment is now explained. The original pixels 301 retrieved from the frame buffer 270 are transformed into transform coefficients 302 by frequency component computing section 300. The transform coefficients 302 are multiplied by the pre-determined values to generate weighted transform coefficients 311 using the coefficient weighting section 310. The weighted transform coefficients 311 are transformed, by the pixel reconstruction section 320, into spatial domain to generate the filtered pixels 321 having different resolution from the original pixels 301.

Figure 6:
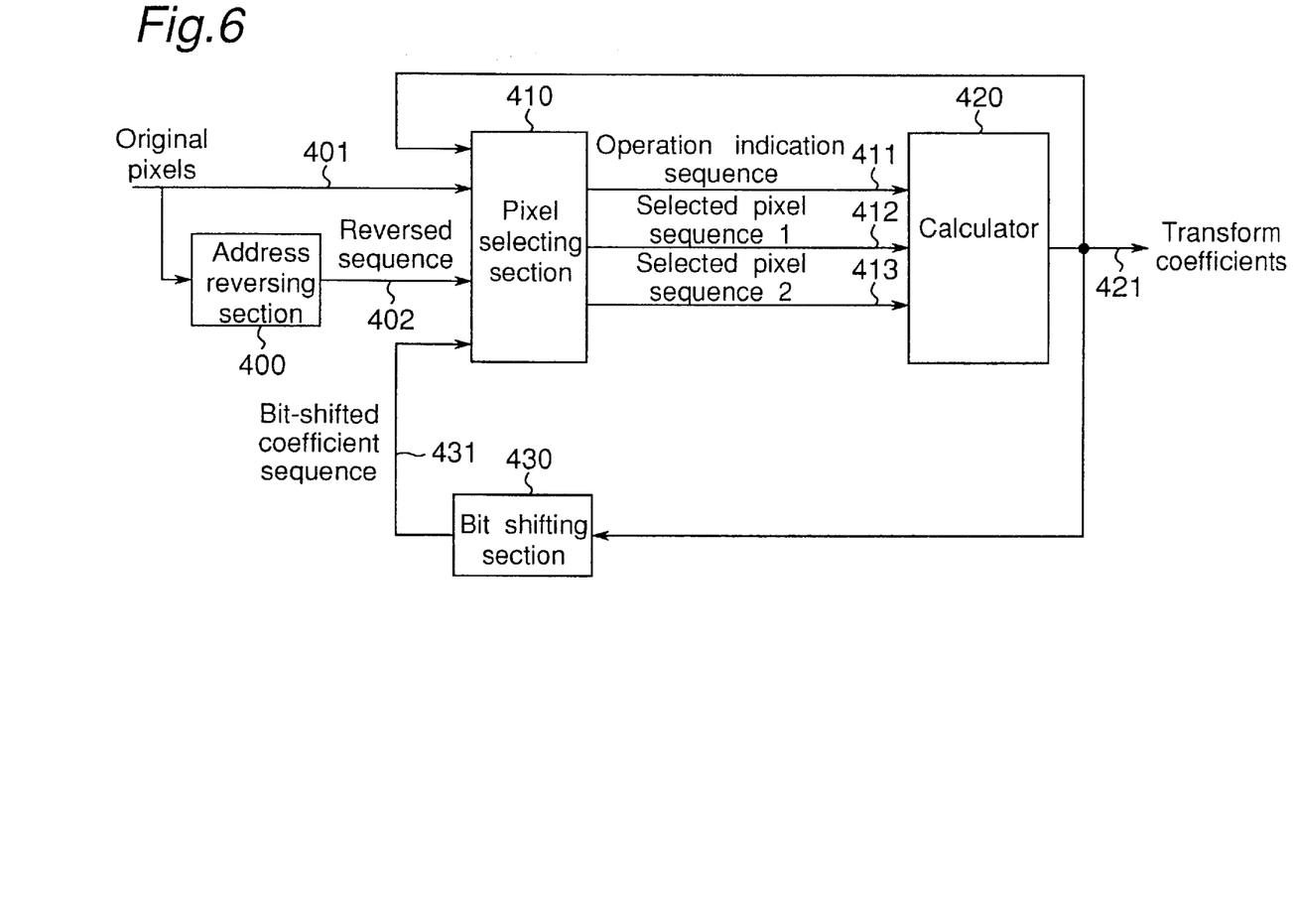
FIG. 6 illustrates a block diagram of the frequency component computing section.

Another embodiment shown in FIG. 6 explains the realization of the frequency component computing section 300 illustrated in FIG. 5. This apparatus comprises an address reversing section 400, a pixel selecting section 410, a calculator 420 which functions as an adder and/or subtractor to produce sum/difference and a bit shifting section 430.

The operation of this embodiment is now explained. The reversed sequence 402 of a block of the original pixels 401 are generated in upper or lower address reversed order by the address reversing section 400. A pair of selected pixel sequences 412, 413 is selected from the original pixels 401, reversed sequence 402, transform coefficients 421 and bit-shifted coefficient sequence 431 by a pixel selecting section 410. An operation indication sequence 411 is also generated by the pixel selecting section 410 to indicate the adding or subtracting operation. The sum or difference of the pair of selected pixel sequences 412, 413 is computed based on the operation indication sequence 411 to generate the transform coefficients 421. Each transform coefficient 421 is shifted by one or more bits by the bit shifting section 430 to generate the bit-shifted coefficient sequence 431.

Figure 7:
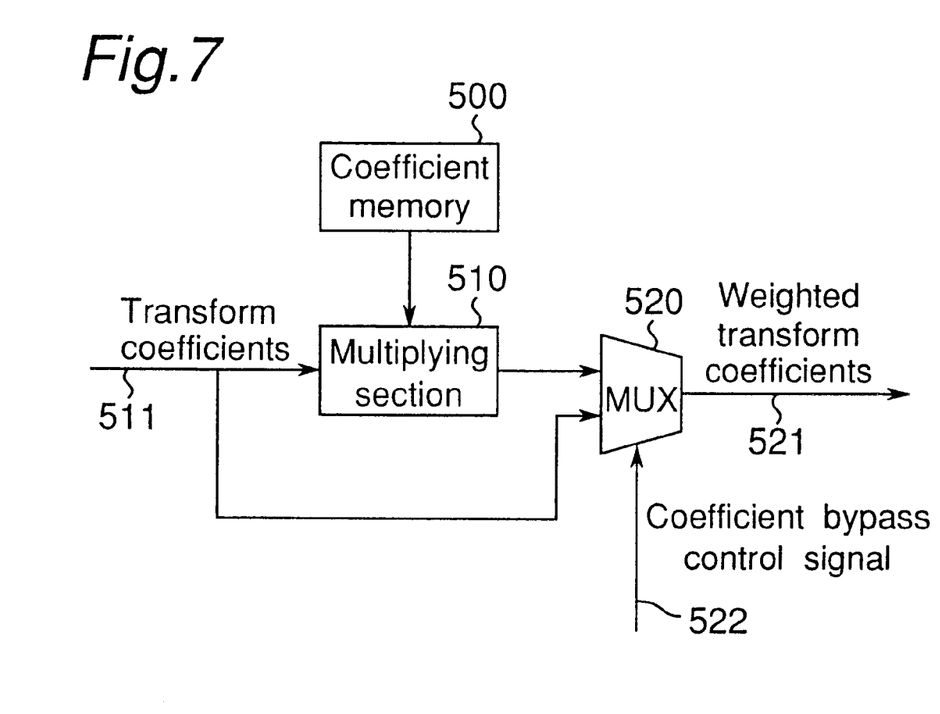
FIG. 7 illustrates a block diagram of the coefficient weighting section.

Another embodiment shown in FIG. 7 explains the details of the coefficient weighting section 310 shown in FIG. 5. This apparatus comprises a coefficient memory 500, a multiplying section 510 and a multiplexer 520.

The operation of this embodiment is now explained. Each transform coefficient 511 is multiplied by one of the pre-determined constant values stored in the coefficient memory 500. The output of multiplying section 510 and the transform coefficients 511 are multiplexed based on a coefficient bypass control signal 522 to provide the weighted transform coefficients 521. The coefficient bypass control signal is determined based on the transform kernels used for the format down-conversion system of digital video.

Figure 8:
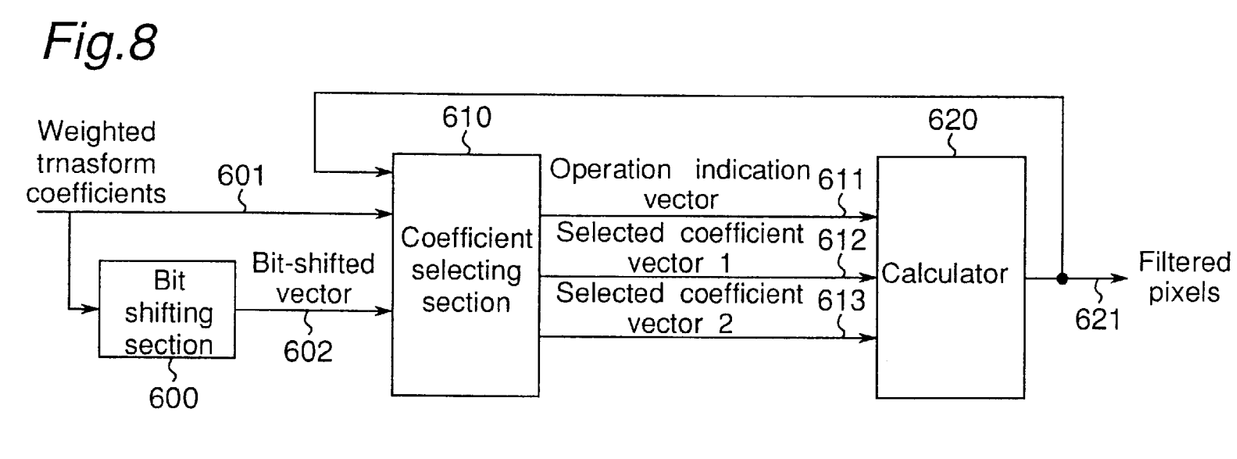
FIG. 8 illustrates a block diagram of the pixel reconstruction section.

Another embodiment shown in FIG. 8 explains the details of the pixel reconstruction section 320 shown in FIG. 5. This apparatus comprises a bit shifting section 600, a coefficient selecting section 610, and a calculator 620 serving as an adder and/or subtractor.

The operation of this embodiment is now explained. The weighted transform coefficients 601 are shifted by one or more bits, by the bit shifting section 600 to generate the bit-shifted vector 602. A pair of selected coefficient vectors 612, 613 is selected from the weighted transform coefficients 601, bit-shifted vector 602 and filtered pixels 621 by the signal selecting section 610. An operation indication vector 611 is also generated by the coefficient selecting section 610 to indicate the adding or subtracting operation. The sum or difference of the selected coefficient vectors 612, 613 is computed based on the operation indication vector 611 to generate the filtered pixels 621.

The immediate effect of the embodiments shown in FIG. 5 through FIG. 8 is that an image interpolation and decimation apparatus can be realized using efficient computation architecture derived according to the properties of generalized orthogonal transforms. Same apparatus can be used for both interpolation and decimation filtering processes derived based on orthogonal transforms. The intermediate computation results are fed back to a signal selecting section for further processing using same circuit. Thus, another effect of the embodiment shown in FIG. 5 through FIG. 8 is that it is possible to reduce the scale of the circuits required for format down-conversion system of digital video.

Figure 9:
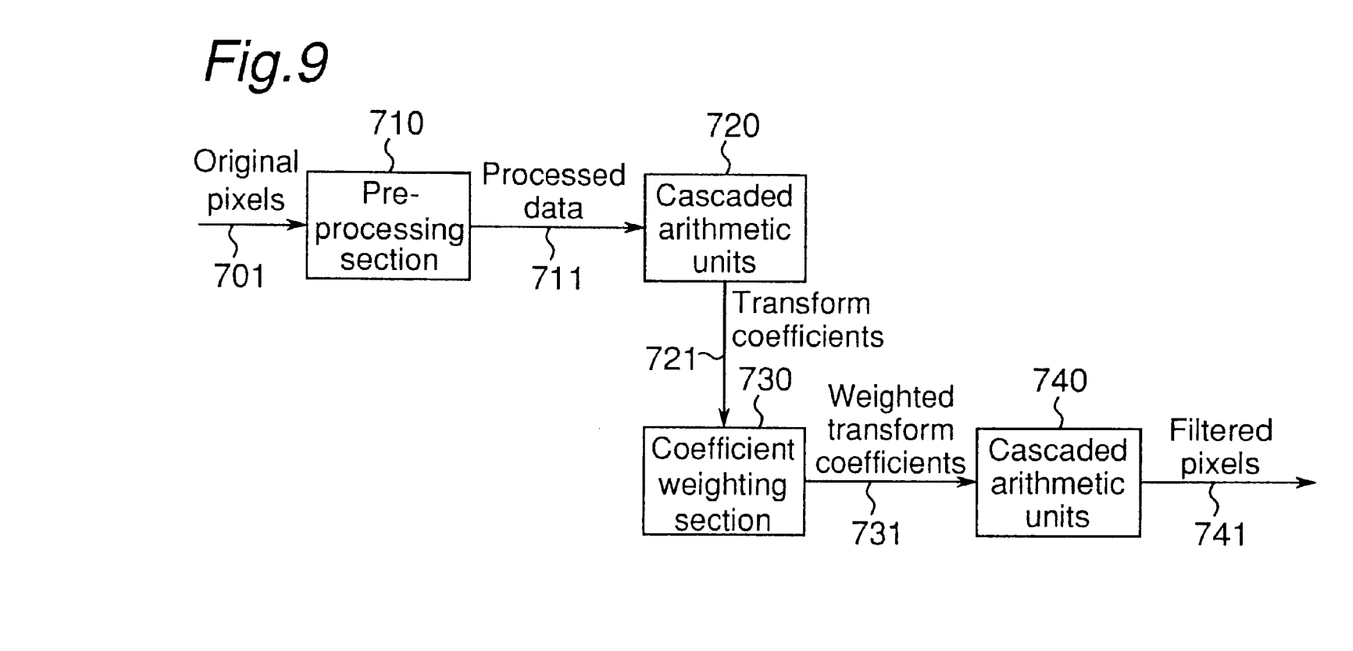
FIG. 9 illustrates a block diagram for interpolation and decimation filtering processing using cascaded arithmetic units.

The embodiment shown in FIG. 9 explains another apparatus for implementation of the interpolation and decimation filtering processes. This apparatus comprises a pre-processing section 710, two sets of cascaded arithmetic units 720, 740 and coefficient weighting section 730.

The operation of this embodiment is now explained. The original pixels 701 are processed by the pre-processing section 710 to generate processed data 711. The processed data 711 is further processed by one set of cascaded arithmetic units 720 to generate the transform coefficients 721 which is the same as the transform coefficients 302 shown in FIG. 5. The coefficient weighting section 730 performs the same operation described in the embodiment shown in FIG. 5 on the transform coefficients 721 and provides the weighted transform coefficients 731. Another set of cascaded arithmetic units receives the weighted transform coefficients 731 and processes them to generate the filtered pixel 741.

Figure 10:
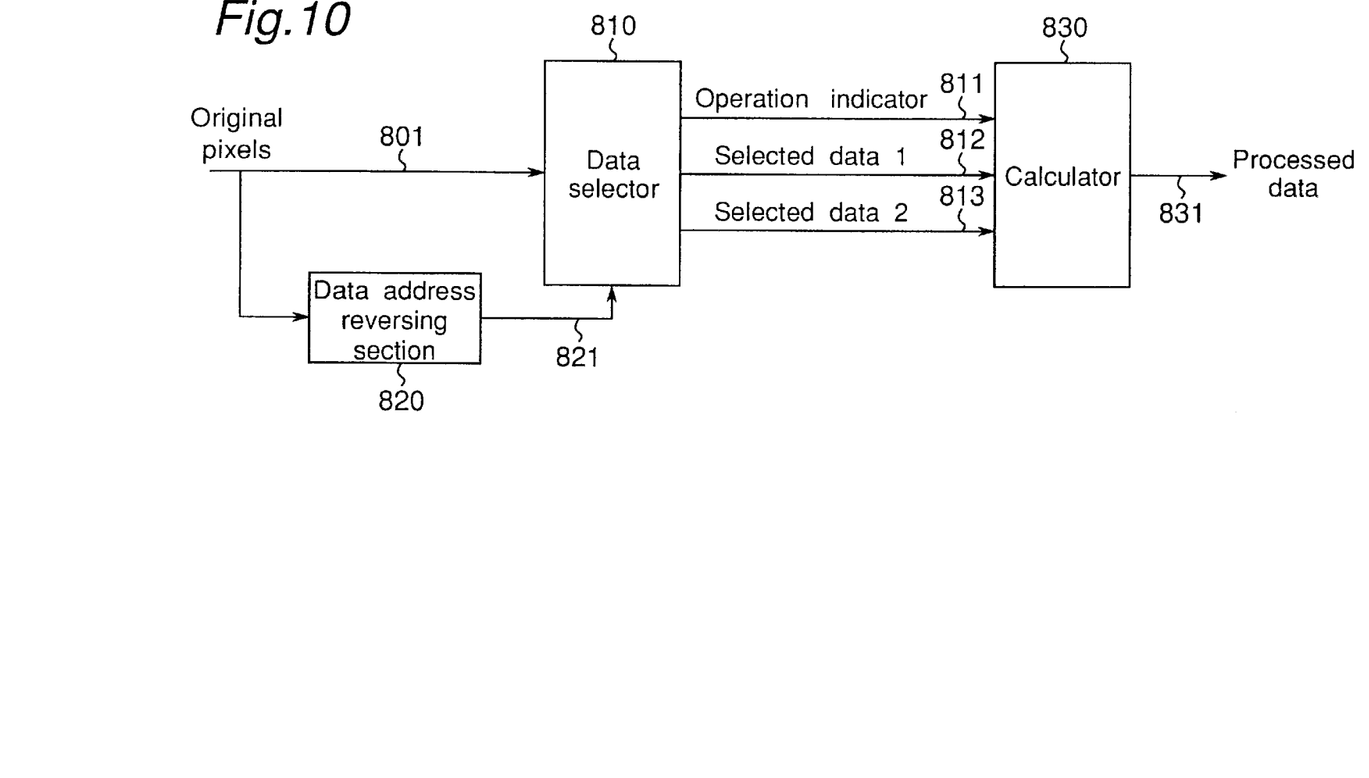
FIG. 10 illustrates a block diagram of the preprocessing section.

The embodiment shown in FIG. 10 explains the details of the pre-processing section used in the embodiment illustrated in FIG. 9. It comprises a data selector 810, a data address reversing section 820 and a calculator 830 for adding and subtracting.

The operation of this embodiment is now explained. The reversed data set 821 of a block of original pixels 801 is generated in upper or lower address reversed order by the data address reversing section 820. The data selector 810 chooses a pair of data 812, 813, from the original pixels 801 and the reversed data set 821, and generates an operation indication data 811. The operation indication data 811 is a binary data with one value indicating adding operation and another value indicating subtracting operation. The calculator 830 computes the sum or difference of the selected pair of data 812, 813 based on the operation indicator 811 to generate the processed data 831.

Figure 11:
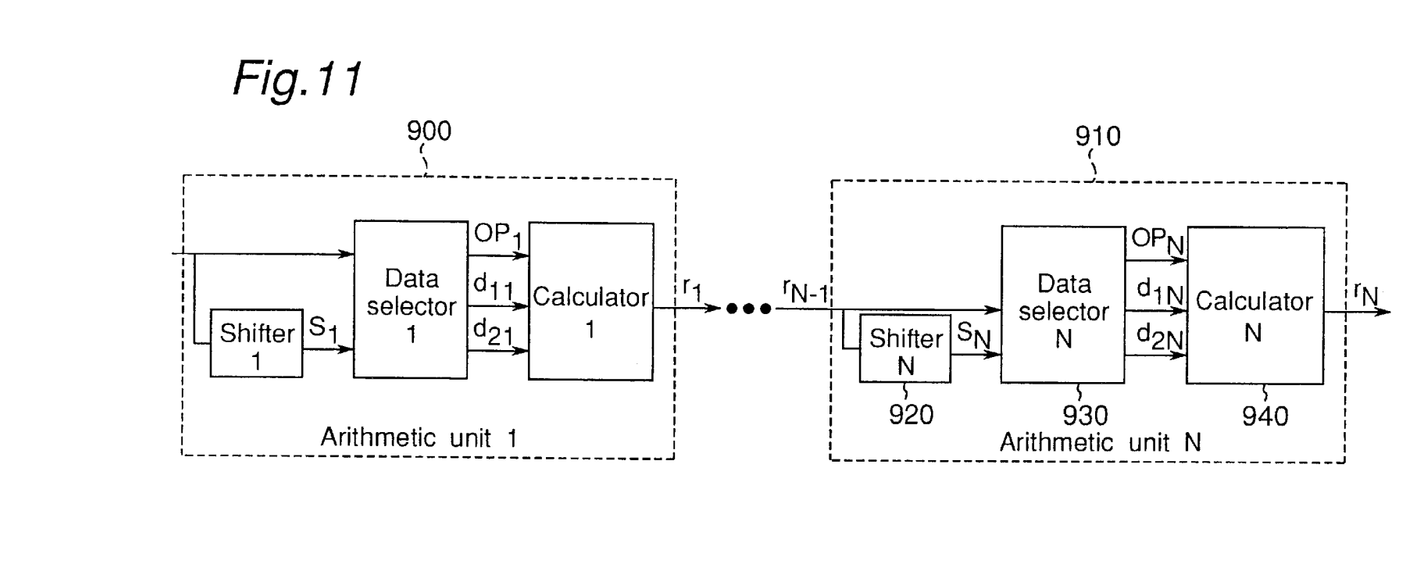
FIG. 11 illustrates a block diagram of cascaded arithmetic units.

Another embodiment shown in FIG. 11 explains the details of the cascaded arithmetic units. The 1st arithmetic unit 900 through the nth arithmetic unit 910, n≧1, are connected with each other in a cascaded way. The nth arithmetic unit 910 comprises a shifter 920, a data selector 930 and a calculator 940 for adding and subtracting.

The operation of the nth (n≧1) arithmetic unit 910 is now explained. The input $r_{n-1}$, which is the output of the (n−1)th arithmetic unit (or the output of the pre-processing section 710 if n=1), is shifted by one or more bits by a shifter 920 to generate the bit-shifted data $S_n$. The data selector 930 chooses a pair of data ($d_{1n}$ and $d_{2n}$), from $r_{n-1}$ and $S_n$, and an operation indicator ($op_n$). The operation indicator ($op_n$) is a binary data with one value indicating adding operation and another indicating subtracting operation. The calculator 940 computes the sum or difference of $d_{1n}$ and $d_{2n}$ based on the value of $op_n$ to generate the output $r_n$ of the nth arithmetic unit 910.

Figure 12:
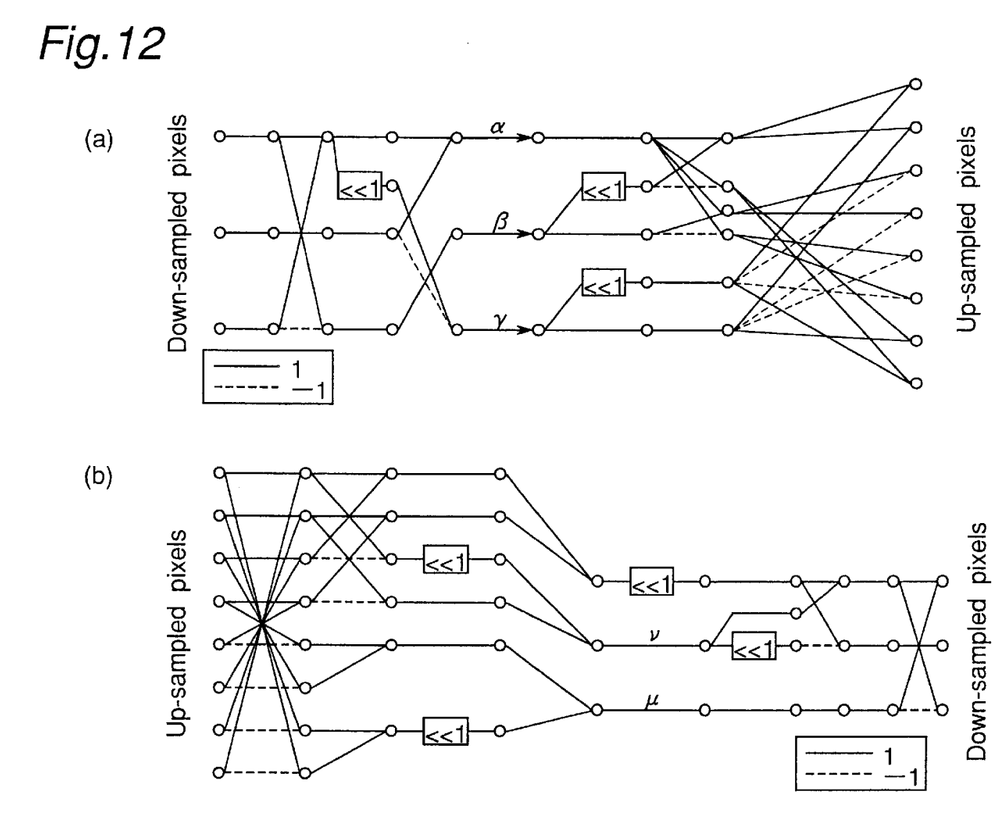

The effect of the embodiments shown in FIG. 9 through FIG. 11 is that it provides an alternative way to implement the interpolation and decimation filtering processing. Similar to the embodiments shown in FIG. 5 through FIG. 8, same architecture can be used for both interpolation and decimation filtering processing derived based on orthogonal transforms. However, there is no feedback loop in each embodiment. Thus, the latency of introduced by the interpolation and decimation circuits can be minimized at the cost of more hardware requirements. A computation architecture, which is built based on the apparatus described in the embodiments shown in FIG. 9 through FIG. 11, for the purpose of video format down-conversion using the orthogonal transform kernels presented in FIG. 2 of this patent specification is illustrated in FIG. 12. In FIG. 2, $K_0$ is used for inverse orthogonal transform. $K_1$ and $K_2$ are used for interpolation processing while $K_3$ and $K_4$ are used for decimation processing. It is clear that compared to the direct implementation of the interpolation and decimation filter realized using the orthogonal transform presented in the prior art (see FIG. 3), the number of shifting and adding operations can be reduced by 46% and 21%, respectively.

This invention produces high-quality video format down-conversion solution. The computational requirement of the invention is much less intensive than that required for the conventional low-resolution video decoding methods or the direct implementation of the digital video format down-conversion method mentioned in the prior art. The apparatus designed for interpolation filter and decimation filter are of the same architecture. The number of shifting and adding operations required by the interpolation and decimation can be reduced by 46% and 21%, respectively, for the video format down-conversion at the down-conversion ratio of 8:3.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for performing efficient motion compensation and digital video format down-conversion using generalized orthogonal transformation, the apparatus comprising:
    a syntax parser and variable-length decoder that decodes a video bit stream and provides decoded motion parameters;
    a frame buffer that stores reconstructed low-resolution pictures and provides low-resolution reference pixels;
    an interpolator, using orthogonal transformation, that maps the low-resolution reference pixels from said frame buffer into a high-resolution space, based on at least one weighted transform coefficient, and provides interpolated pixels;
    an inverse motion compensator that performs half-pel motion compensation and provides high-resolution motion-compensated pixels, said inverse motion compensator receiving the interpolated pixels provided by said interpolator and the decoded motion parameters provided by said syntax parser and variable-length decoder, and
    a decimator, using orthogonal transformation that maps high-resolution motion-compensated pixels into a low-resolution space, based on at least one weighted transform coefficient, and provides decimated pixels.

2. An apparatus for performing efficient interpolation and decimation computation for motion compensation with digital video format down-conversion, the apparatus comprising:
    a frequency component computer that receives a block of original pixels, transforms the original pixels into a frequency domain, and provides transform coefficients;
    a coefficient weighting section that receives the transform coefficients and multiplies each transform coefficient by one of a plurality of pre-determined constant values to generate a weighted transform coefficients; and
    a pixel reconstruction section that receives the weighted transform coefficients and generates filtered pixels which have a resolution different from a resolution of the original pixels.

3. The apparatus according to claim 2 wherein said frequency component computer receives the original pixels from a frame buffer, and said pixel reconstruction section provides interpolated pixels to an inverse motion compensator that performs half-pel motion compensation.

4. The apparatus according to claim 2 wherein said frequency component computer receives the original pixels from an inverse motion compensator, and said pixel reconstruction section provides decimated pixels to an adder.

5. The apparatus according to claim 2 wherein said frequency component computer further comprises:
    an address reversing section that provides a reversed sequence of the block of original pixels in upper address reversed order;
    a pixel selecting section that receives the original pixels, the reversed sequence, the transform coefficients and a bit-shifted coefficient sequence and provides an operation indication sequence, a first selected pixel sequence, and a second selected pixel sequence;
    a calculator that computes at least one of a sum and a difference of pairs of pixels, a first pixel of the pair being from the first selected pixel sequence and a second pixel being from the second selected pixel sequence, based on the operation indication sequence, to generate the transform coefficients; and
    a bit shifter that shifts each of the transform coefficients by at least one bit to generate the bit-shifted coefficient sequence.

6. The apparatus according to claim 2 wherein said frequency component computer further comprises:
    an address reversing section that provides a reversed sequence of the block of original pixels in lower address reversed order;
    a pixel selecting section that receives the original pixels, the reversed sequence, the transform coefficients and a bit-shifted coefficient sequence and provides an operation indication sequence, a first selected pixel sequence, and a second selected pixel sequence;
    a calculator that computes at least one of a sum and a difference of pairs of pixels, a first pixel of each pair being from the first selected pixel sequence and a second pixel being from the second selected pixel sequence, based on the operation indication sequence, to generate the transform coefficients; and
    a bit shifter that shifts each of the transform coefficients by at least one bit to generate the bit-shifted coefficient sequence.

7. The apparatus according to claim 2 wherein said coefficient weighting section further comprises:
    a coefficient memory that stores the plurality of pre-determined constant values;
    a multiplier that receives the transform coefficients, and multiplies one of the transform coefficients by one of the pre-determined constant values stored in said coefficient memory; and
    a multiplexer that selects one of an output of said multiplier and the transform coefficients, based on a coefficient bypass control signal, to provide the weighted transform coefficients.

8. The apparatus according to claim 2 wherein said pixel reconstruction section further comprises:
    a bit shifter that shifts each of the weighted transform coefficients by at least one bit to generate a bit-shifted vector;
    a coefficient selecting section that receives the weighted transform coefficients, the bit-shifted vector and the filtered pixels and provides an operation indicator vector, a first selected coefficient vector, and a second selected coefficient vector; and
    a calculator that computes at least one of a sum and a difference of pairs of coefficients, a first coefficient of each pair being from the first selected coefficient vector and a second coefficient being from the second selected coefficient vector, to generate the filtered pixels.

9. The apparatus according to claim 2 wherein said frequency component computer comprises:

a pre-processing section that receives the original pixels and manipulates the received pixels algebraically to provide processed data; and at least one cascaded arithmetic unit having an input terminal and an output terminal.

10. The apparatus according to claim 9 wherein the input terminal of a first cascaded arithmetic unit is coupled to said pre-processing section.

11. The apparatus according to claim 9 wherein the input terminal of an mth cascaded arithmetic unit is coupled to the output terminal of an (m−1)th cascaded arithmetic unit, m being greater than 1.

12. The apparatus according to claim 9 wherein the output terminal of a last cascaded arithmetic unit provides the transform coefficients to said coefficient weighting section.

13. The apparatus according to claim 9 wherein said preprocessing section further comprises:

a data address reversing section that provides a reversed data set of the block of original pixels in an upper address reversed order;

a data selecting section that receives the original pixels and the reversed data set and provides an operation indication set, a first selected data set and a second selected data set; and a calculator that computes at least one of a sum and a difference of pairs of data, a first data of each pair being from the first selected data set and the a second data being from the second selected data set, based on the operation indication set to generate the processed data.

14. The apparatus according to claim 9 wherein said pre-processing section further comprises:

a data address reversing section that provides a reversed data set of the block of original pixels in a lower address reversed order;

a data selecting section that receives the original pixels and the reversed data set and that provides an operation indication set, a first selected data set and a second selected data set; and a calculator that computes at least one of a sum and a difference of pairs of data, a first data of each pair from the first selected data set and a second data from the second selected data set, based on the operation indication set to generate the processed data.

15. The apparatus according to claim 2 wherein said pixel reconstruction section further comprises at least one cascaded arithmetic unit having an input terminal and output terminal.

16. The apparatus according to claim 15 wherein the input terminal of the first cascaded arithmetic unit is coupled to said coefficient weighting section.

17. The apparatus according to claim 15 wherein the input terminal of an mth cascaded arithmetic unit is coupled to the output terminal of the an (m−1)th cascaded arithmetic unit, m being greater than 1.

18. The apparatus according to claim 15 wherein the output terminal of a last cascaded arithmetic unit provides the filtered pixels.

19. The apparatus according to claim 9 wherein an nth cascaded arithmetic unit, n being greater than or equal to 1, comprises:

a shifter that shifts input data by at least one bit to generate a bit-shifted data set;

a data selector that receives the input data and the bit-shifted data set and provides an operation indication set, a first selected data set and a second selected data set; and a calculator that one of adds and subtracts selected data sets, from the first selected data set and the second selected data set, based on the operation indication set and provides the output of said cascaded arithmetic unit.

20. The apparatus according to claim 15 wherein an nth cascaded arithmetic unit, n being greater than or equal to 1, comprises:

a shifter that shifts the input data by at least one bit to generate bit-shifted data set;

a data selector that receives the input data and the bit-shifted data set and provides an operation indication set, a first selected data set and a second selected data set; and a calculator that one of adds and subtracts selected data sets from the first selected data set and the second selected data set, based on the operation indication set, and outputs the cascaded arithmetic unit.

* * * * *

UNITED STATES PATENT AND TRADEMARK OFFICE
CERTIFICATE OF CORRECTION

PATENT NO. : 6,724,822 B1
DATED : April 20, 2004
INVENTOR(S) : Bi Mi Michael et al.

It is certified that error appears in the above-identified patent and that said Letters Patent is hereby corrected as shown below:

Title page,
Item [56], References Cited, U.S. PATENT DOCUMENTS, "6,489,815 B2   12/2002   Ohno" should be -- 6,498,815 B2   12/2002   Kleihorst --.

Signed and Sealed this

Twenty-eighth Day of September, 2004

JON W. DUDAS
*Director of the United States Patent and Trademark Office*